(12) United States Patent
Kang et al.

(10) Patent No.: US 10,525,416 B2
(45) Date of Patent: Jan. 7, 2020

(54) METHOD OF LIQUID FILTER WETTING

(71) Applicant: Tokyo Electron Limited, Minato-ku, Tokyo (JP)

(72) Inventors: Hoyoung Kang, Guilderland, NY (US); Anton deVilliers, Clifton Park, NY (US); Corey Lemley, Albany, NY (US)

(73) Assignee: Tokyo Electron Limited, Tokyo (JP)

( * ) Notice: Subject to any disclaimer, the term of this patent is extended or adjusted under 35 U.S.C. 154(b) by 398 days.

(21) Appl. No.: 15/661,551

(22) Filed: Jul. 27, 2017

(65) Prior Publication Data
US 2018/0333680 A1 Nov. 22, 2018

Related U.S. Application Data

(60) Provisional application No. 62/506,918, filed on May 16, 2017.

(51) Int. Cl.
*B01D 19/00* (2006.01)
*B01D 65/02* (2006.01)
*B01D 71/36* (2006.01)
*B01D 71/56* (2006.01)
*B01D 63/14* (2006.01)
*B01D 63/06* (2006.01)
*B01D 29/01* (2006.01)
*B01D 29/11* (2006.01)
*B01D 65/00* (2006.01)

(52) U.S. Cl.
CPC .......... *B01D 65/02* (2013.01); *B01D 29/012* (2013.01); *B01D 29/111* (2013.01); *B01D 63/06* (2013.01); *B01D 63/14* (2013.01); *B01D 71/36* (2013.01); *B01D 71/56* (2013.01); *B01D 2321/18* (2013.01)

(58) Field of Classification Search
CPC .......................... B01D 19/00; B01D 19/0031; B01D 2311/00; B01D 2311/04; B01D 2311/13
USPC ........ 438/689, 690, 691, 692, 758; 210/600, 210/749, 767, 188, 636; 95/149, 154, 95/156, 159, 158, 171, 205, 241, 243, 95/245, 263, 265, 273
See application file for complete search history.

(56) References Cited

U.S. PATENT DOCUMENTS 6,176,252 B1 * 1/2001 Peng .................. F04F 1/14
137/209
6,336,960 B1 * 1/2002 Marinaro ............. B01D 36/001
210/436

\* cited by examiner

Primary Examiner — Allison G Fitzsimmons
(74) Attorney, Agent, or Firm — Wood Herron & Evans LLP

(57) ABSTRACT

A process is disclosed for wetting a filter cartridge used to treat a liquid solvent used in semiconductor manufacture. In the process, a filter cartridge having void spaces wherein the void spaces contain residual gas from the manufacturing process used to make the filter cartridge is connected to a source of purging gas. The purging gas is flowed through the filter cartridge to at least partially displace at least a portion of the residual gas from the manufacturing process used to make the filter cartridge. Next, liquid solvent is pumped through the filter cartridge so that the purging gas dissolves into the liquid solvent and to at least partially fill the void spaces to thereby at least partially wet out the filter cartridge with the liquid solvent.

20 Claims, 4 Drawing Sheets

METHOD OF LIQUID FILTER WETTING

TECHNICAL FIELD OF THE INVENTION

This invention relates to a method of wetting a filter cartridge used in the filtration of liquid solvents such as photoresist fluids used in the manufacture of semiconductor devices. More particularly, this invention relates to the use of gases to flow through the filter cartridge to purge the residual gas and to move into void spaces in the filter prior to flowing the liquid solvent into the filter cartridge to thereby accelerate the wetting of the filter cartridge by the liquid solvent as compared to flowing liquid solvent through the filter cartridge without flowing the purging gases through the filter cartridge.

BACKGROUND

Currently, liquid solvents such as photoresist fluid is used ubiquitously in the production of semiconductor devices. Photoresist fluids, including positive and negative photoresist fluids, are used in processes such as photolithography and photoengraving to create coating patterns on the surface of a semiconductor wafer. High purity photoresist fluids are desired so that the semiconductor devices are free from contaminants, impurities, and the like that could hamper or destroy the functioning of the semiconductor devices. At this time, the photoresist fluids are typically subjected to filtration to reduce or eliminate contaminants that might be in the photoresist fluids received from manufacturers thereof.

The photoresist fluid filtration is often conducted by flowing the photoresist fluid through a filter cartridge which includes a nylon or polytetrafluoroethylene filter. As received from a manufacturer, the filtration cartridge includes void space through which liquid solvent, such as photoresist fluid, flows over the solid filter surface. Currently, liquid solvent is flowed through the filter cartridge to fill the void spaces through the filter until bubbles no longer exit the filter cartridge. This technique fully wets out the filter and also serves to flush the filter of any unwanted contaminants. Thus, the filter is flushed and wetted to rinse the filter membrane, reduce leachables and presence of any handling or installation residue in the downstream system, and to wet the filter prior to a pre-use integrity test. The reduction of leachables and downstream particles are intrinsic benefits of a liquid solvent flush to wet for integrity testing and do not require separate actions. However, the liquid solvent exiting the filter is discarded, producing increased costs than would otherwise be desirable. The inventors herein recognized that residual gas in the filter cartridge as received from a manufacturer dissolves more slowly into the liquid solvent that is otherwise desirable, resulting in inefficiency and loss of liquid solvent.

For example, FIG. 1 shows a prior art system used in a flushing procedure currently used in industry to wet a filter cartridge. In this set up, the liquid solvent, such as a photoresist fluid, wets the filter, flushes out air bubbles, and also flushes out leachable contaminants left from the manufacturing process used to make the filter. The liquid solvent is typically flushed until no bubbles appear in the liquid solvent that exits the filter cartridge. The liquid solvent that is used to flush the filter cartridge is discarded.

The inventors herein recognize that the discarded photoresist fluid is wasteful and adds cost to the manufacture of semiconductor devices. The inventors sought to provide a solution for this problem.

SUMMARY OF THE INVENTION

The present invention provides a solution to one or more of the problems or disadvantages discussed above.

In the practice of this invention, the process wets a filter cartridge used to treat a liquid solvent used in semiconductor manufacture. In the process, a filter cartridge having void spaces wherein the void spaces contain residual gas from the manufacturing process used to make the filter cartridge is connected to a source of gas used to purge the residual gas. As used herein the gas used to purge the residual gas is referred to as a "purging gas." The purging gas is flowed through the filter cartridge to at least partially displace at least a portion of the residual gas from the manufacturing process used to make the filter cartridge. Next, liquid solvent is pumped through the filter cartridge so that the purging gas dissolves into the liquid solvent and to at least partially fill the void spaces to thereby at least partially wet out the filter cartridge with the liquid solvent.

More particularly, in one broad respect, this invention is a process for wetting a filter cartridge used to treat a liquid solvent used in semiconductor manufacture, comprising: providing a filter cartridge having void spaces wherein the void spaces contain residual gas from the manufacturing process used to make the filter cartridge; flowing a purging gas through the filter cartridge to at least partially displace at least a portion of the residual gas from the manufacturing process used to make the filter cartridge; and pumping the liquid solvent through the filter cartridge so that the purging gas dissolves into the liquid solvent and to at least partially fill the void spaces. In the practice of this invention, the purging gas is selected so that the purging gas has attributes which permit the purging gas to readily dissolve into the liquid solvent. For example, a nonpolar organic gas can be used to flush the filter cartridge prior to pumping an organic photoresist fluid through the filter cartridge.

In one embodiment, purging gas is a nonpolar organic compound having one or more carbon atoms. The nonpolar organic compounds can be $CH_4$, $CHF_3$, $C_2H_2F_4$, $C_4H_{10}$, or other fluorinated gases. In one embodiment, the purging gas is flowed through the filter cartridge until at least 50 percent of the residual gas has been displaced.

In one embodiment, the liquid solvent is flowed through the filter cartridge at a rate of 0.1 to 12 L/min.

In one embodiment, the purging gas is flowed through the filter cartridge at a temperature of from 10 to 50 degrees Centigrade.

In one embodiment, the filter in the filter cartridge is made of nylon, polytetrafluoroethylene, or the like.

In one embodiment, the process reduces the time to fully wet out the filter cartridge with the liquid solvent as compared to a process where liquid solvent is pumped through the filter cartridge without previously flowing the purging gas through the filter cartridge.

In one embodiment, the liquid solvent is a photoresist fluid which is flowed through the filter cartridge until no bubbles exit the filter cartridge.

In one embodiment, the purging gas has a purity of at least 99 percent.

In one embodiment, the purging gas is a nonpolar organic gas.

In one embodiment, the purging gas is carbon dioxide, ammonia, or a volatile amine.

In one embodiment, the purging gas is methane, ethane, propane, butane, a fluorinated ethylene, or a combination thereof.

In one embodiment, the liquid solvent is a photoresist fluid.

In one embodiment, the liquid solvent flows through the filter cartridge until no bubbles exit the filter cartridge.

In one embodiment, the filter cartridge is disconnected from the source of liquid solvent after liquid solvent has wetted out the filter cartridge.

In one embodiment, the purging gas is ethane, propane, butane, or a combination thereof.

In one embodiment, the purging gas is tetrafluoroethane, tetrafluoromethane, difluroethane, or a combination thereof.

In one embodiment, the filter cartridge is connected to a source of purging gas prior to flowing the purging gas through the filter cartridge.

In one embodiment, the filter cartridge is connected to a source of liquid solvent prior to pumping the liquid solvent through the filter cartridge.

The method of this invention provides an improved method for wetting a filter cartridge for use with a liquid solvent used in semiconductor fabrication such as a photoresist fluid. A purging gas is selected which dissolves more readily in a given liquid solvent than the residual gas in the filter cartridge as received from a manufacturer. Advantageously, the use of the purging gas to at least partially fill the void space of the filter cartridge serves to accelerate wetting out the filter cartridge with the liquid solvent. Advantageously, the use of a purging gas reduces the initial particle count of solvent exiting the filter cartridge during the wetting out of the filter cartridge versus the particle count of solvent exiting a filter cartridge with no purging gas used. An especially useful liquid solvent employed in the practice of this invention is a photoresist fluid.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an improved method of wetting a filter cartridge with a liquid solvent such as a photoresist fluid prior to use of the photoresist fluid being used in the manufacture of semiconductor devices.

As received from a manufacturer of filter cartridges, the filter cartridges have void spaces that contain residual gas from the manufacturing process. The residual gas can be nitrogen, air, or air with traces of unreacted chemicals used in the manufacture of the filter cartridge. Typically, the residual gas is air. Because air does not dissolve well into the photoresist fluid, the photoresist fluid must be flowed through the filter cartridge for an extended period of time to force air bubbles out of the void spaces in the filter cartridge.

Figure 1:
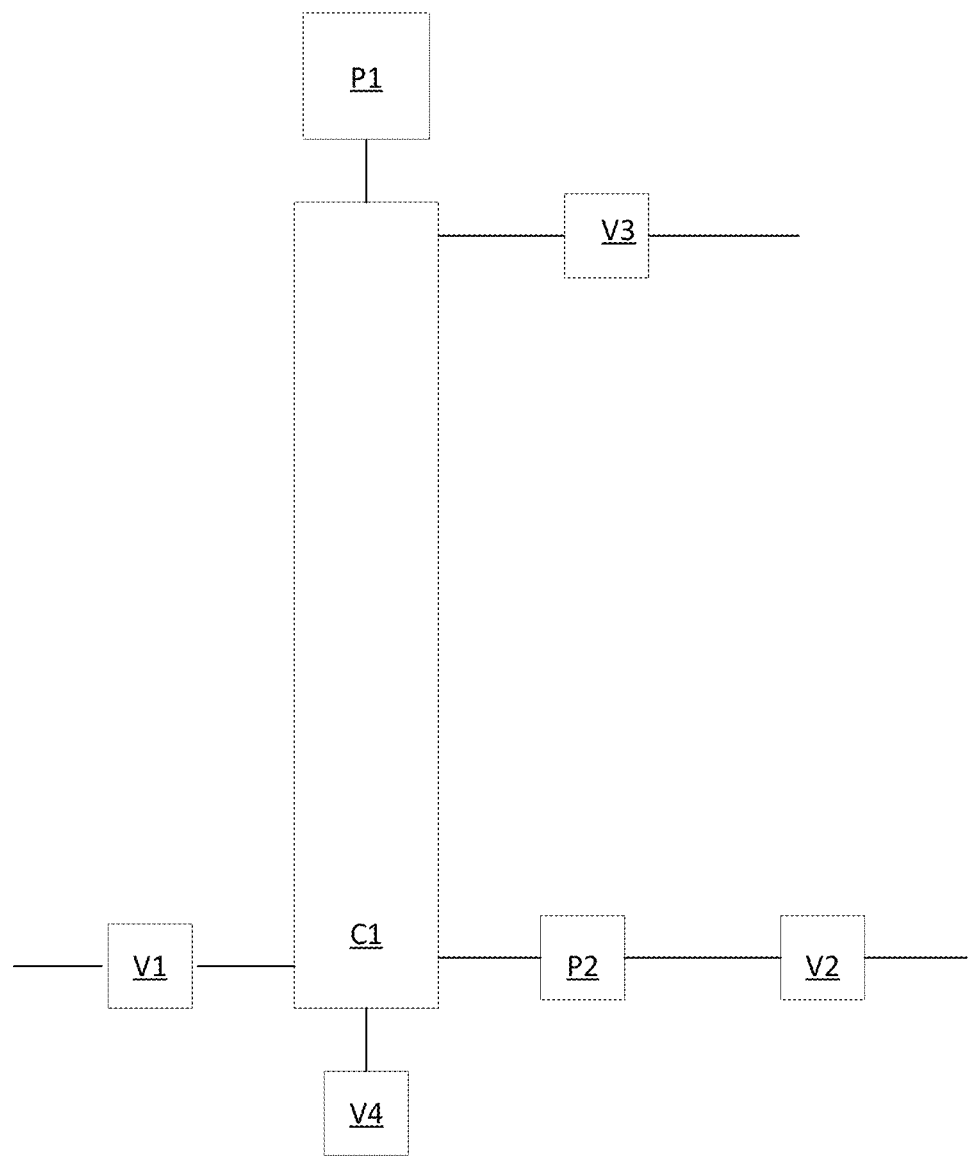
FIG. 1 shows a prior art system for flushing and wetting a filter cartridge.

FIG. 1 illustrates a prior art system used in a flushing procedure currently used in industry. In this set up, all valves start closed. Next inlet valve V1 and vent valve V3 are opened. The pump or open pressure source is slowly started to bleed air from the assembly through V3. When trapped air is no longer seen, V3 is closed. After bleeding and closing V3, and while maintaining inlet pressure for a given filter at upstream pressure gauge P1, outlet valve V2 is opened until a backpressure of greater than, for instance, 14 pounds per square inch gauge is indicated on downstream pressure gauge P2. Flow rate through filter cartridge C1 is maintained as provided for by a manufacturer for a given filter. V1 and V2 are adjusted as needed to maintain the flow/pressure and backpressure conditions.

The filter is flushed for a given amount of time, and then the system is drained by opening V4 then V3. Next, V1, V3, and V4 are closed, while fully opening V2. An integrity test is performed, if desired. Whether or not an integrity test is conducted, the fluid used to flush the filter is discarded.

Figure 2:
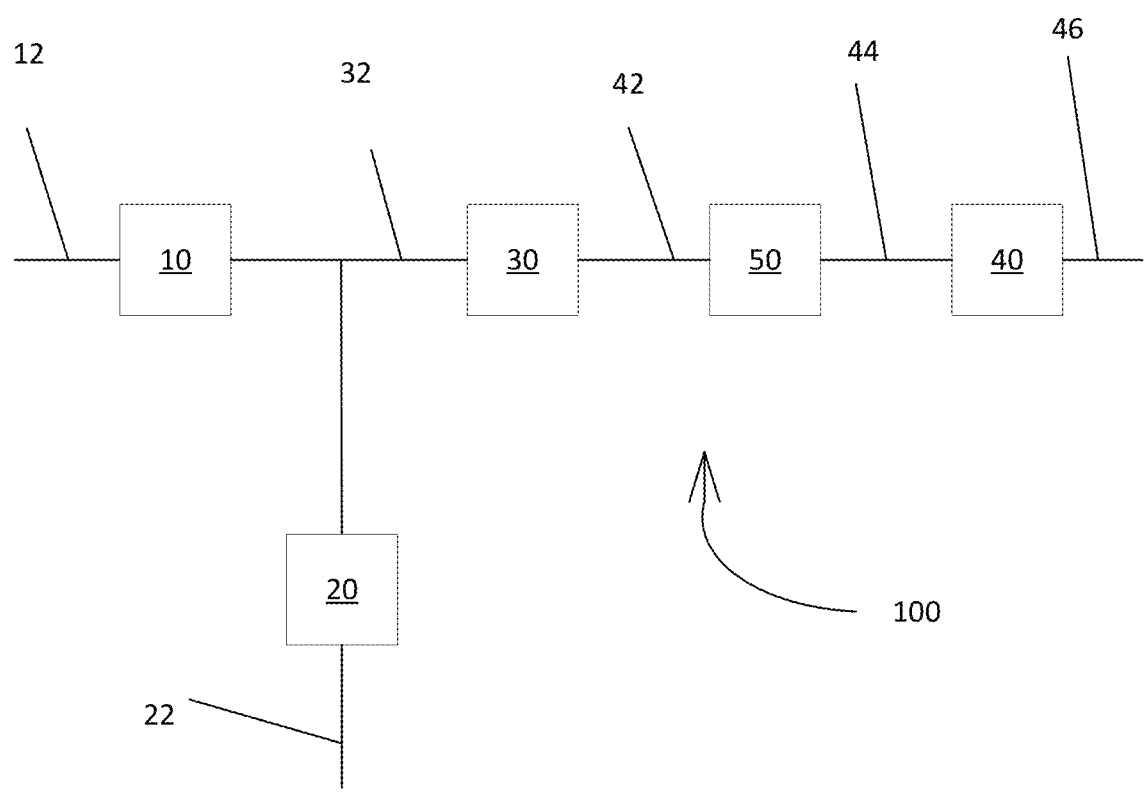
FIG. 2 shows a system for flushing and wetting a filter cartridge in accordance with this invention.

FIG. 2 illustrates a system 100 of this invention which can be used to wet the filter cartridge 50. FIG. 2 thus shows a first valve 10 in line 12. First valve 10 serves to open and close the flow of a liquid solvent such as a photoresist fluid. Second valve 20 is situated in line 22. Second valve 20 serves to open and close the flow of a purging gas, which serves to displace the residual gas in the filter cartridge 50. Both the liquid solvent and purging gas flow through line 32 to third valve 30. Third valve 30 serves to open and close flow of either the purging gas or the liquid solvent to flow through line 42 into the filter cartridge 50. The liquid solvent and the purging gas that enter the filter cartridge 50 exit the filter cartridge 50 through line 44. Fourth valve 40 serves to permit purging gas or liquid solvent to flow out of the filter cartridge 50 during wetting of the filter cartridge 50 or during dispensing of the liquid solvent during use in the production of a semiconductor device by flowing out of the fourth valve 40 through line 46.

As used herein, the first valve 10 can be referred to as the liquid solvent valve 10. The second valve 20 can be referred to as the purging gas source valve. The third valve 30 can be referred to as the filter cartridge inlet valve. The fourth valve 40 can be referred to as the filter cartridge exit valve.

A representative protocol for wetting the filter cartridge 50 can be as follows. As a first step in the wetting protocol, the second valve 20, the third valve 30, and the fourth valve 40 are opened in order. That is, the second valve 20 is opened, then the third valve 30 is opened, then the fourth valve 40 is opened. By opening second, third, and fourth valves 20, 30, 40 in sequence, the purging gas is permitted to flow through the filter cartridge 50.

During the first stop in the wetting protocol, the purging gas flows through the system 100. The purging gas is under pressure to force the purging gas through the system 100. The purging gas can be provided via a pressurized tank. Alternatively, the purging gas can be pressurized through an in-line pump. The flow rate and pressure under which the purging gas can be supplied to the system 100 can be any rate which will allow the purging gas to flow through the filter cartridge 50 to at least partially fill the void space in the filter cartridge 50 and to displace at least a portion of the residual gas. It should be appreciated the filter cartridge 50 and system 100 may have maximum pressure tolerance depending on the equipment ratings of the valves, lines, and filter cartridge.

The purging gas is flowed through the filter cartridge 50 for a time effective to displace at least a portion of the pre-existing, residual gas within the filter cartridge 50 as received from the manufacturer. Typically the purging gas is flowed through the filter cartridge 50 at ambient temperatures, though the temperature of the purging gas and/or the filter cartridge 50 can be adjusted if desired. The longer the purging gas is flowed through the filter cartridge 50, the more residual gas will be displaced by the purging gas up to a maximum amount of purging gas which fills the void space such that effectively all the gas in the filter cartridge is the purging gas. If desired, all of the gas exiting the system 100 can be sampled to determine the extent of purging gas in the voids of the filter cartridge 50. For example, the gas exiting the system 100 can be analyzed using gas chromatography, mass spectroscopy, or other conventional methodology.

In one embodiment, the purging gas flows through the filter cartridge for a time sufficient to displace at least 50 percent of the residual gas in the filter cartridge 50. In another embodiment, the purging gas flows through the filter cartridge 50 to displace at least 80 percent of the residual gas in the filter cartridge 50. In another embodiment, the purging gas flows through the filter cartridge 50 until at least 95 percent of the residual gas is displaced in the filter cartridge 50. Preferably, the purging gas flows through the filter cartridge 50 until at least 99 percent of the residual gas, which is made up of nitrogen, air, or other initial gas, is displaced in the filter cartridge 50.

The purging gas displaces the air found in the filter cartridge 50 as received from a manufacturer. In one embodiment, the purging gas dissolves more quickly into photoresist fluid as compared to air, thereby reducing the amount of photoresist fluid needed to fully wet out the filter cartridge 50. It should be appreciated that the greater the amount of purging gas in the filter cartridge 50, the more rapidly the filter cartridge 50 will wet out when the photoresist fluid is injected into the filter cartridge 50. The purging gas thus also reduces the amount of photoresist fluid that would otherwise be wasted and discarded, thereby reducing costs and disposal handling.

When the purging gas has flowed through the filter cartridge 50 for an appropriate length of time effective to reduce the amount of residual gas in the filter cartridge 50, fourth valve 40 is closed. After closing the fourth valve 40, the second valve 20 and third valve 30 are also closed.

The purging gas can be flowed through the filter cartridge 50 in as many runs as desired. Likewise, the method can include creating a full or partial vacuum in the filter cartridge 50 before initiating the flow of purging gas into the filter cartridge 50. The additional vacuum step can reduce the amount of residual gas in the filter cartridge and thus accelerate displacement of the residual gas by the purging gas. The vacuum step can be repeated after purging gas is introduced into the filter cartridge 50 to rapidly reduce residual in the filter cartridge 50. The vacuum/purging gas flow steps can be repeated as desired.

The pressure of the purging gas can be any pressure effective to introduce the purging gas into the filter cartridge 50 and to flow the purging gas through the filter cartridge 50. This pressure may vary depending on the size, type, and specifications of the filter cartridge 50.

It should be appreciated that the valves shown in FIG. 2 can also be three-way valves with the accompanying changes to the system 100.

After closing the second valve 20, the third valve 30, and the fourth valve 40, first valve 10 is opened followed by opening the fourth valve 40. With the first valve 10 and fourth valve 40 open, liquid solvent begins flowing through the filter cartridge 50. As the liquid solvent flows through the filter cartridge 50, the purging gas dissolves into the liquid solvent.

After a given period of time, such as a time sufficient to permit the flow at least one volume of the filter cartridge 50 of the liquid solvent to flow through the filter cartridge 50 until the filter cartridge 50 is fully wetted out. The flow can be observed to determine if bubbles are in the photoresist fluid and flow can be continued until no bubbles appear in the liquid solvent. A particle sensor can be used to determine if bubbles are present in the photoresist fluid.

After the determination is made that the filter cartridge 50 is fully wetted, the filter cartridge 50 can be removed from lines 42 and 44 so that the filter cartridge 50 can be moved to a semiconductor fabricating device if the filter cartridge 50 was not already connected to a semiconductor fabricating device. If the filter cartridge 50 is in place to be connected to a semiconductor manufacturing device, then the appropriate connections can be connected. Alternatively, the filter cartridge 50 and system 100 can already be in line for use in the semiconductor manufacturing device, such as a system 100 where there is additional valving downstream of the fourth valve 40 which are configured to allow discarding of residual gas and purging gas as well as discarding liquid solvent containing gas bubbles, and additional valving and lines to send the liquid solvent to the semiconductor manufacturing device.

The filter cartridges employed in the practice of this invention are available commercially from, for example, Pall Corporation. The filter cartridge, in general, includes a filter material held within a sealed cartridge housing that includes end caps having inlet and outlet members on opposite ends of the cartridge. The filter cartridges subject of this invention are used in commercial chemical processing of semiconductor wafers in fabrication facilities. The filter material can be made of, for example, nylon, polytetrafluoroethylene, perfluoroalkoxy, among other materials. The filter can be made of materials that are either hydrophobic or hydrophilic. Non-polar organic gasses are used to treat the hydrophilic filter cartridges, while other gasses such as carbon dioxide are used to treat the hydrophobic filter cartridges. The cartridge filters are constructed with a filter membrane in a pleated, disc, or tubular configuration. The filter cartridges serve to remove a broad range of acids, bases, solvents, other chemicals, particulates, and so on from the photoresist fluid to be treated. The filter material can also be adapted for use with a permanent cartridge housing installed in-line in the fabrication equipment such that an old filter is removed and a new filter is replaced, with the cartridge housing reused.

The filter cartridges thus can be a disposable-type filter which are formed of a housing shell and an encapsulated nylon or polytetrafluoroethylene filter materials. The disposable-type filters serve to eliminate the need for handling of hazardous chemicals and minimizes installation time. The filter cartridges used in the practice of this invention are preferably a disposable-type filter cartridge.

Representative examples of commercially available filter cartridges currently in use made by Pall Corporation, including microbially-rated filter cartridges. It should be noted that commercially available filter cartridges are typically rated by the manufacturer for flow rates for wetting. The flow rates depend on the type of filter, type of fluid, size of the filter, configuration of the filter, and so on. Typical flow rates of fluid may rate from 0.1 mL/minute to 12 L/minute or more. It should be appreciated that the pumps used to deliver fluid to a filter cartridge should be effective to meet the manufacturer's suggested flow rates. The flow rate can be determined using standard procedures, such as an in-line flow meter or even procedures potentially as simple as checking volume in a graduated beaker or other cylinder.

The purging gasses that can be used in the practice of this invention to displace the gas that exists in a filter cartridge upon receipt from a manufacturer or otherwise used prior to wetting can include nonpolar organic compounds that readily dissolve into the organic solvent or photoresist fluid to be filtered in the filter cartridge. The purging gasses employed in the practice of this invention can vary depending on the type of solvent or photoresist fluid that is ultimately to be flowed through the filter cartridge. For an organic solvent or photoresist fluid, the purging gasses can include nonpolar hydrocarbons and halogenated hydrocarbons. Such nonpolar gasses include methane, ethane, propane, butane, and other higher hydrocarbons that are gaseous under the conditions under which the filter cartridge is flushed with the organic gas. As used herein, propane and butane include their isomers including for example isopropyl alcohol and 2-methylpropane.

The nonpolar gasses can include halogenated hydrocarbons, including but not limited to methylene chloride, carbon tetra chloride, trichloromethane, chloromethane, chlorinated ethylenes including those having from 1 to 6 chlorines, fluoromethane, difluoromethane, triflouromethane, fluoroethylene, difluoroethylene, trifluoroethylene, tetrafluoroethylene, and mixtures thereof.

Other halogens that can be used include iodine and bromine, so long as the corresponding halogenated hydrocarbon is gaseous at the conditions used in the process of this invention.

Likewise, the number of carbons in the gasses can be higher than two carbons if the compounds are gaseous at the temperature and conditions under which the filter cartridge is flushed with the purging gas in the practice of this invention.

For an aqueous solvent or alcoholic solvent to be filtered through the filter cartridge, the purging gas can include carbon dioxide, ammonia, a volatile amine, and combinations thereof. These purging gasses are readily dissolved in an aqueous solvent or alcoholic solvent that is to be filtered in the filter cartridge.

The liquid solvents and photoresist fluids used in the practice of this invention are available commercially. The liquid solvents can be aqueous solvents, alcoholic solvents, and non-aqueous non-polar organic solvents. Preferably, the compounds to be treated in accordance with this invention are photoresist fluids. The photoresist fluids can be either positive or negative photoresist fluids. Representative examples of such commercially available photoresist fluids include but are not limited to ArF negative and positive photoresist fluids and ArF immerision photoresist fluid available from JSR Micro.

Figure 3:
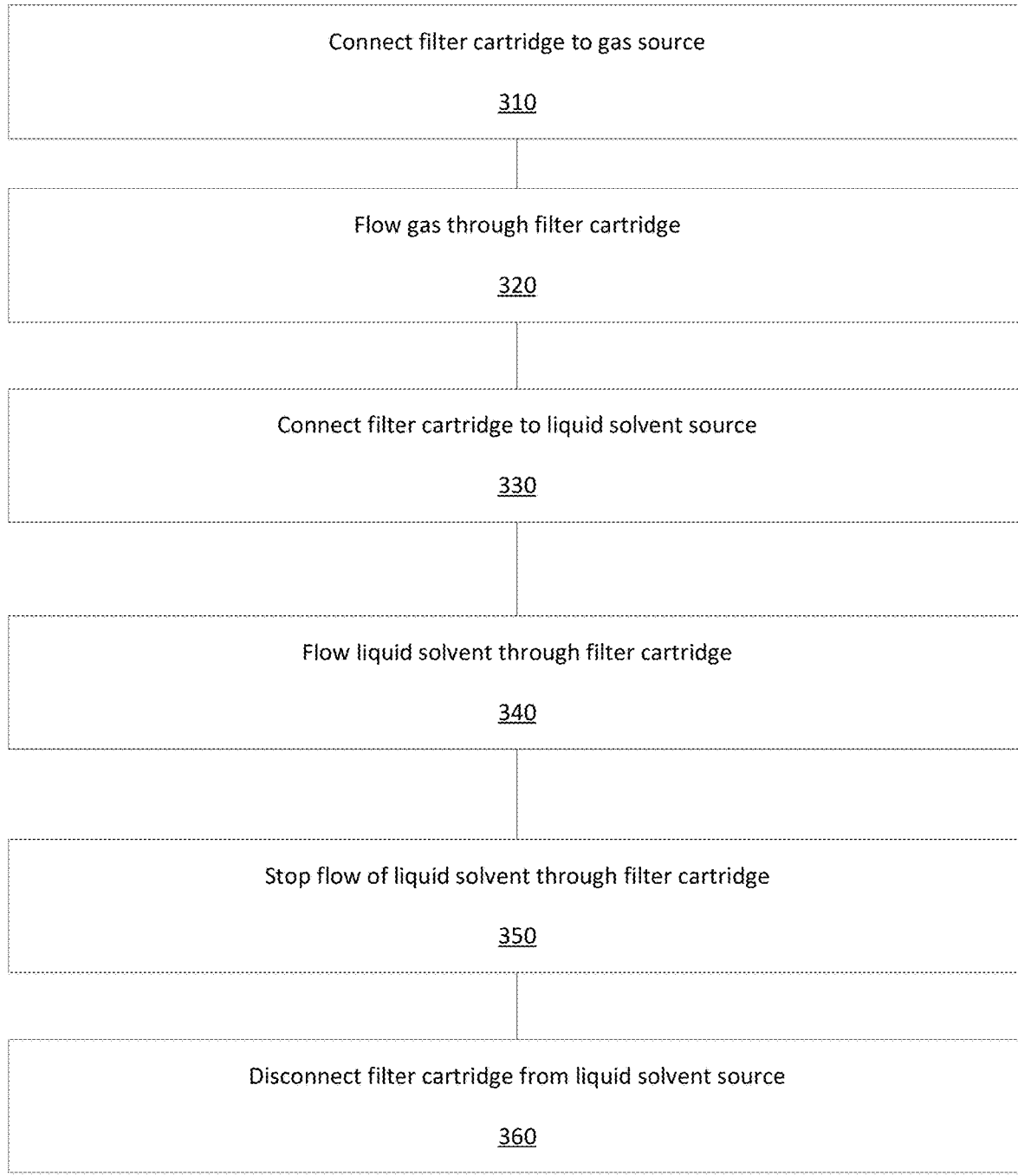
FIG. 3 shows a flow chart representing the steps used in the flushing and wetting process in accordance with this invention.

FIG. 3 illustrates a flow chart of the process of this invention. In step 310 a filter cartridge received from a manufacturer is connected to a purging gas source. In step 320, the purging gas is flowed through the filter cartridge until at least a portion of the residual gas is purged. Such residual gas can be air or nitrogen that was present in the filter cartridge upon receipt from the manufacturer. In step 330, the filter cartridge is disconnected from the purging gas source and connected to a source of liquid solvent or photoresist fluid. In step 340, the liquid solvent or photoresist fluid is flowed through the filter cartridge which absorbs the purging gas and allows the liquid solvent or photoresist fluid to more rapidly wet the filter cartridge as compared to the rate of wetting of the filter cartridge as received from the manufacturer. The liquid solvent or photoresist fluid is flowed through the filter cartridge to wet the filter cartridge, to dissolve leachables or push particulates through the filter cartridge, and to flow the liquid solvent or photoresist fluid until such time as no bubbles appear in the liquid solvent or photoresist fluid that flows exits the filter cartridge, at which time the flow of liquid solvent or photoresist fluid is stopped in step 350. Next in step 360 the filter cartridge is disconnected from the wetting system and either immediately put into service in a semiconductor fabrication device, or is stored until it is needed to replace an old filter. The method of this invention provides an improved method for wetting a filter cartridge for use with a liquid solvent used in semiconductor fabrication such as a photoresist fluid. Advantageously, a purging gas is selected which dissolves more readily in a given liquid solvent than the residual gas in the filter cartridge as received from a manufacturer. Advantageously, the use of the purging gas to at least partially fill the void space of the filter cartridge serves to accelerate wetting out the filter cartridge with the liquid solvent. Advantageously, an especially useful liquid solvent employed in the practice of this invention is a photoresist fluid.

Figure 4:
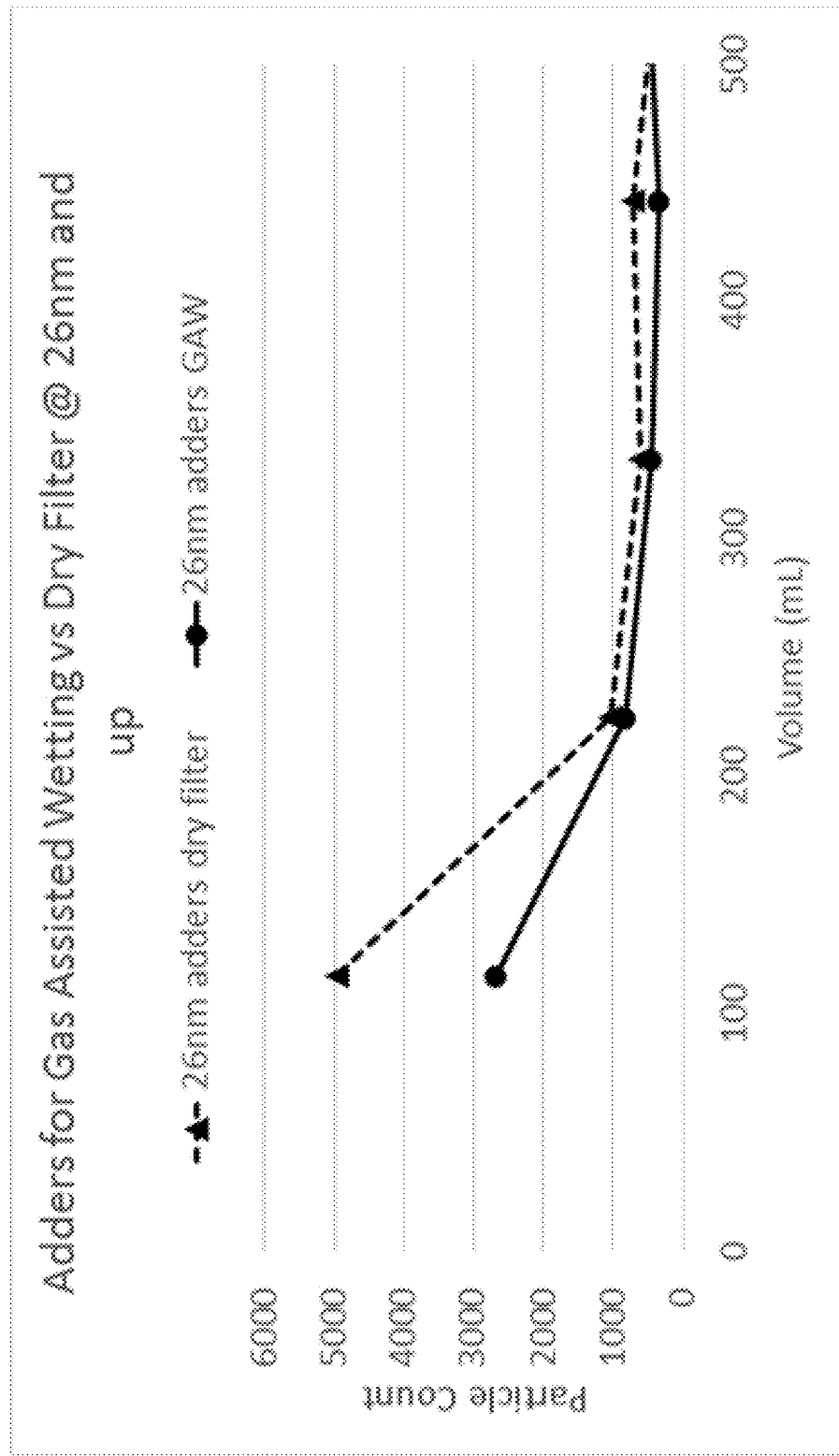
FIG. 4 shows a graph which indicates the particle count of solvent exiting a filer cartridge versus volume of solvent injected into the filter cartridge.

FIG. 4 shows a graph of particle count versus solvent volume flowed through a filter cartridge. The dotted line shows the particle count when using a dry filter. The solid line shows the particle count after flowing a purging gas through the filter cartridge prior to flowing a solvent through the filter cartridge to wet it out. "Particle count" in FIG. 4 refers to particles having a size of 26 nm and greater. Such particles include gas bubbles entrained in the solvent. Dotted and solid lines in FIG. 4 begin when solvent starts exiting the filter cartridge. A little more than 100 mL of solvent is needed to fill the filter cartridge before solvent is expelled from the filter cartridge. As can be seen, the particle count in solvent after purging gas is employed (a particle count of approximately 2700) is nearly half the particle count of solvent exiting a dry filter cartridge where no purging gas was used (a particle count of approximately 5000). As expected, over time the particle counts of dotted and solid lines converge after about 220 mL of solvent has flowed into the filter cartridge. FIG. 4 demonstrates the use of a purging gas is an important variable which can be controlled in accordance with this invention to achieve more rapid reduction of particle counts in the solvent exiting a filter cartridge as the filter cartridge is wet out.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A process for wetting a filter cartridge used to treat a liquid solvent used in semiconductor manufacture, comprising:

providing a filter cartridge having void spaces wherein the void spaces contain residual gas from the manufacturing process used to make the filter cartridge;

flowing a purging gas through the filter cartridge to at least partially displace at least a portion of the residual gas from the manufacturing process used to make the filter cartridge; and thereafter pumping the liquid solvent through the filter cartridge so that the purging gas dissolves into the liquid solvent and to at least partially fill the void spaces.

2. The process of claim 1, wherein the purging gas is an organic nonpolar gas having one or more carbon atoms.

3. The process of claim 1, wherein the purging gas is flowed through the filter cartridge until at least 50 percent of the residual gas has been displaced.

4. The process of claim 1, wherein the liquid solvent is flowed through the filter cartridge at a rate of 0.1 to 12 L/min.

5. The process of claim 1, wherein the purging gas is flowed through the filter cartridge at a temperature of from 10 to 50 degrees Centigrade.

6. The process of claim 1, wherein the filter in the filter cartridge is made of nylon or polytetrafluoroethylene.

7. The process of claim 1, wherein the process reduces the time to fully wet out the filter cartridge with the liquid solvent as compared to a process where liquid solvent is pumped through the filter cartridge without previously flowing the purging gas through the filter cartridge.

8. The process of claim 1, wherein the liquid solvent is a photoresist fluid which is flowed through the filter cartridge until no bubbles exit the filter cartridge.

9. The process of claim 1, wherein the liquid solvent is an aqueous solvent or an alcohol.

10. The process of claim 1, wherein the purging gas is a nonpolar organic gas.

11. The process of claim 1, wherein the purging gas is carbon dioxide, ammonia, or a volatile amine.

12. The process of claim 1, wherein the purging gas is methane, ethane, propane, butane, or a fluorinated ethylene.

13. The process of claim 1, wherein the liquid solvent is a photoresist fluid.

14. The process of claim 1, wherein the liquid solvent flows through the filter cartridge until no bubbles exit the filter cartridge.

15. The process of claim 1, wherein the purging gas has a purity of at least 99 percent.

16. The process of claim 1, wherein the filter cartridge is disconnected from a source of the liquid solvent after liquid solvent has wetted out the filter cartridge.

17. The process of claim 1, wherein the purging gas is ethane, propane, butane, or a combination thereof.

18. The process of claim 1, wherein the purging gas is tetrafluoroethane, tetrafluoromethane, difluroethane, or a combination thereof.

19. The process of claim 1, wherein the filter cartridge is connected to a source of purging gas prior to flowing the purging gas through the filter cartridge.

20. The process of claim 1, wherein the filter cartridge is connected to a source of liquid solvent prior to pumping the liquid solvent through the filter cartridge.

* * * * *